J. H. CALL.
Calipers.
No. 32,410.
Patented May 28, 1861.
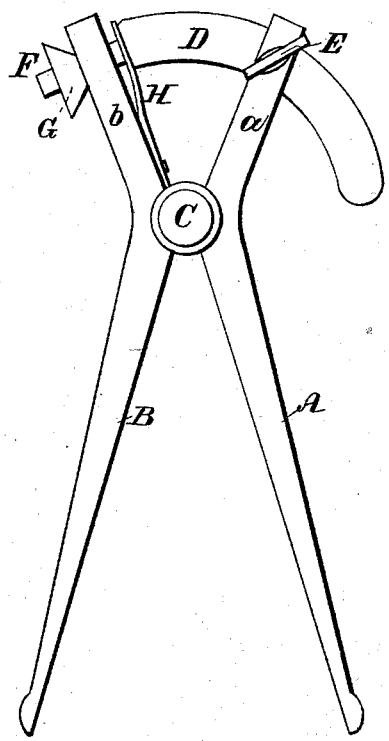
Witnesses
Milton Bradley
Edmund Case
Inventor
James H. Call

UNITED STATES PATENT OFFICE.

J. H. CALL, OF SPRINGFIELD, MASSACHUSETTS.

CALIPERS.

Specification of Letters Patent No. 32,410, dated May 28, 1861.

*To all whom it may concern:*

Be it known that I, J. H. CALL, of Springfield, in the county of Hampden and Commonwealth of Massachusetts, have invented a new Improvement in the Construction of Inside Calipers; and I do hereby declare that the following is a full, clear, and exact description of the construction and operation of the same, reference being had to the accompanying drawings, making a part of these specifications.

My invention relates to an instrument known as inside calipers, the use of which is to measure the diameter of a cylindrical hole as for instance the bore of a steam cylinder, or of some other piece of mechanism.

In order to be of any practical utility in any exact work, a pair of calipers whether outside or inside, must be provided with a micrometer screw to accurately adjust the instrument to small distances, and also with some device for confining the legs the one to the other, so that when once set the points can not be moved, to or from each other.

A, and B, are two legs hinged together at C. Attached to A, and in one piece with it is the arm $a$, and attached to B, the arm $b$, the two pieces being halved together and lapping on to each other, without crossing to form the joint C.

D, is a quadrant passing through a slot in $a$.

E, is a thumb screw to confine the arm $a$, to the quadrant D. This quadrant is formed into a screw F, at one end, which screw passes freely through the arm $b$, having a thumb nut G, outside of the arm.

H is a spring attached to the inside of the arm $b$, and pressing against a shoulder on the quadrant D, thereby keeping the thumb nut in close contact with the arm $b$.

The operation is as follows: Suppose it is desirable to get the diameter of the bore of a steam cylinder; loosen the thumb screw E, insert the points into the bore of the cylinder and open them as far as possible, and then tighten the screw E, and the instrument will be set very nearly, but if a more accurate measurement is required the points of the calipers can be opened or closed through a small arc by the micrometer screw F, and spring H.

Now the quadrant D, thumb screw E, spring H, and thumb nut G, are all old devices and have long been applied to legs of compasses. But in using compasses there is no very decided tendency to press the points either to or from each other, but in calipers it is different. In outside calipers the whole tendency is to push the points farther from each other, while in using inside calipers the whole tendency is to bring the points nearer together. Now if I arrange a pair of inside calipers like compasses, that is, without the arms $a$, and $b$, above the joint, and bring the quadrant below the joint, and passing through the legs A, and B, any pressure on the outside of the points would press directly on the spring and the points would not be permanent and therefore worthless. Now by extending the arms $a$, and $b$, above the joint as represented, and forming the joint as herein described without having the legs cross each other, the quadrant is carried back out of the way, and the spring so situated that any natural pressure in the use of the instrument has no effect on the spring and therefore the points are as permanent as if there was no spring there. The same effect can be produced by placing the quadrant below the joint, and attaching the spring to the outside of the leg, with the thumb nut inside, the legs of course being crooked to form a place for the nut.

Now having fully described the construction and operation of my invention what I claim as new and desire to secure by Letters Patent is, The construction of inside calipers with a micrometer screw and spring substantially in the manner as herein set forth.

JAMES H. CALL.

Witnesses:
MILTON BRADLEY,
EDMUND CASE.